1,886,649

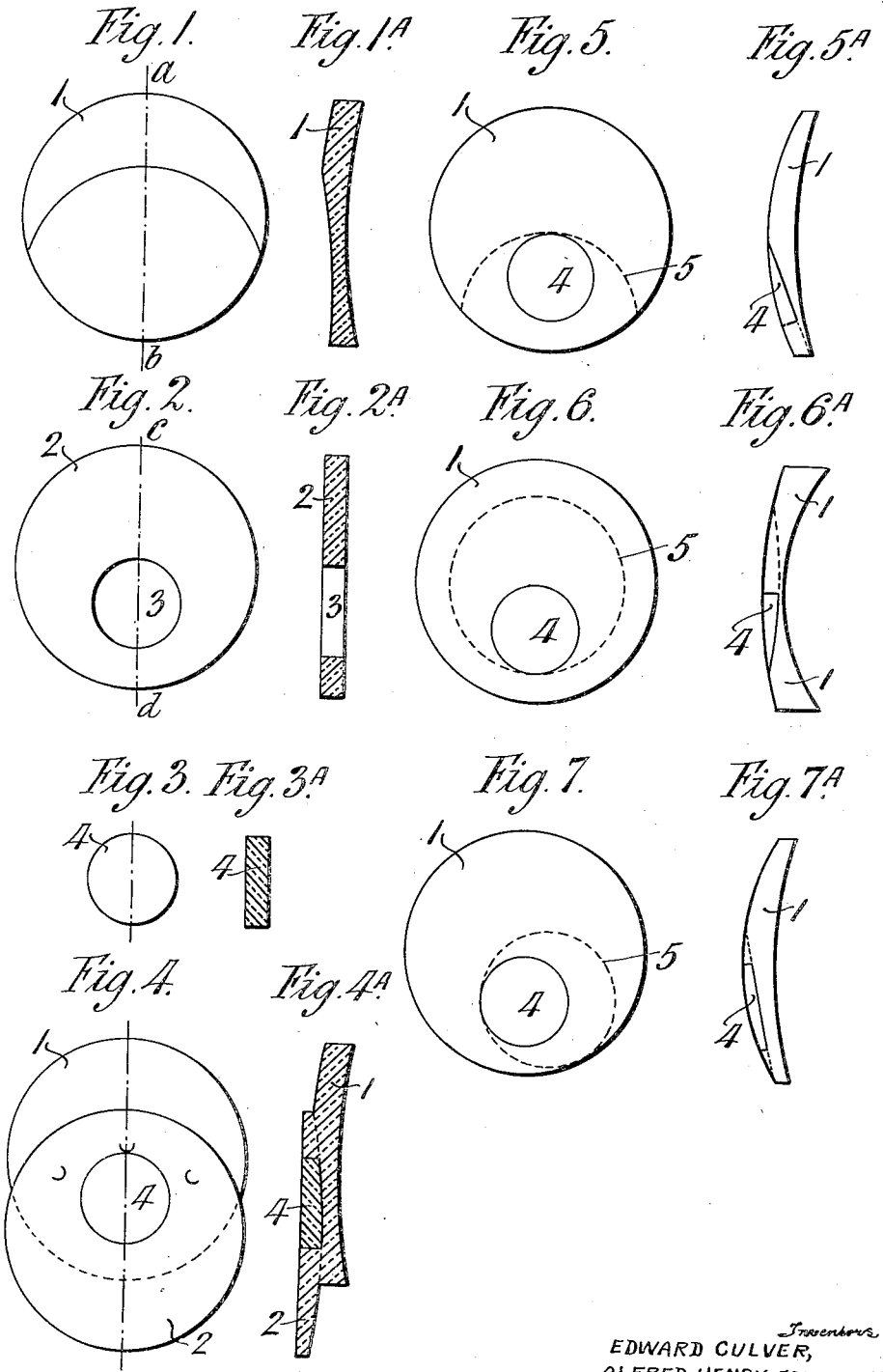
Nov. 8, 1932. E. CULVER ET AL 1,886,649
MANUFACTURE OF FUSED BIFOCAL LENSES
Filed May 23, 1930
EDWARD CULVER,
ALFRED HENRY EMERSON, Patented Nov. 8, 1932

UNITED STATES PATENT OFFICE

EDWARD CULVER, OF CROUCH END, LONDON, AND ALFRED HENRY EMERSON, OF FINCH-LEY, LONDON, ENGLAND, ASSIGNORS TO UNITED KINGDOM OPTICAL COMPANY, LIMITED, OF LONDON, ENGLAND

MANUFACTURE OF FUSED BIFOCAL LENSES

Application filed May 23, 1930, Serial No. 455,029, and in Great Britain January 23, 1930.

This invention relates to an improved method of manufacture of fused bifocal lenses.

In ordinary fused bifocal lenses the reading segment is necessarily circular. In the type of fused bifocal described in the specification of Patent No. 1632208 the segment is part of a circle the prismatic power introduced by the reading segment being controlled according to the portion of the circle that is chosen, with the result that its direction is always in the vertical; that is to say, the base of the prism, if any, introduced by the reading segment is always either base up or base down and is limited and does not provide prism in any other direction such for example as prism base in for reading which is so often required. In other words the prismatic power introduced by such reading segments is controlled by their shape and size.

The object of this invention is to enable the amount and direction of prismatic power to be accurately controlled, independently of the shape of the reading segment so that any desired shape of segment may be employed with any desired amount of prismatic power, within reasonable limits and with the base of the prism in any desired direction.

According to the present invention the method consists in fusing on to a major lens. in one side of which has previously been ground a depression, a correspondingly ground segment piece formed of the same glass as the major lens with an eccentrically positioned insert of a higher refractive index and of the shape and size required for the reading segment. It will thus be seen that by varying the angular relation of the vertical axis of the segment piece and its insert with respect to the vertical meridian of the major lens, the direction of the base of the prism can be controlled as desired.

The desired amount of prism in the reading segment can, by this method of manufacture be controlled in either one of the following operations:—

(1) By grinding the depression curve in the major lens at a suitable angle to the surface thereof, and after fusing the segment piece in correct position, surfacing the whole so as to keep the prismatic power of the segment as desired.

(2) By grinding the segment piece after fusion, until the segment circle is the correct size to give the desired amount of prism.

The size of the circle of the segment piece which is of course invisible after fusing as the outer portion of the segment piece is of the same glass as the major lens into which it is fused, is calculated by expressing the prism dioptres required in terms of decentration and adding such decentration to the distance from the nearest part of segment circle to the centre of the reading segment, which gives the radius of the segment circle.

Preferably in this second operation one or both of the contact surfaces of the major lens and segment piece, is, before fusion marked by lines or curves which may be tangential to or just outside the segment circle required, when, after fusion, the segment side of the lens blank is ground until the marks disappear to leave the correct size of segment circle.

The major lens which is of crown glass and usually called the countersink, since it has a depression ground in it on one side, into which the segment piece is fused, is ground with a larger depression than usual for a fused bifocal; in some cases it may have to be ground almost over the entire surface of the lens blank.

The segment piece is prepared by either moulding or piercing a hole or slot in a plate of crown glass of exactly the same optical and physical qualities as the major lens or countersink, the inside of which hole or slot is then suitably prepared for the reception of the insert formed from a piece of higher refractive glass also suitably finished to nearly fit the hole. The two parts of the segment piece are then placed in a furnace and raised to a temperature high enough to melt one of the glasses so that they fuse together at their edges and form a solid segment piece which after being well annealed is surfaced to correspond with the depression curve ground on the major lens, in the usual way, although greater accuracy is required than is normally the case with a fused bifocal lens other than the type referred to above.

It is to be understood that the slot may be formed by cutting the glass plate inwardly from one edge or the slot may be entirely within the plate. Alternatively a depression may be cut or otherwise formed in one side of the glass plate into which depression a piece of glass of higher refractive index is fused. It will thus be seen that the piece or insert of high index glass which is to become the reading segment is surrounded or nearly surrounded by glass of exactly the same optical properties as the major lens, the shape of the hole, slot or depression mainly determining the final shape of the reading portion and which may be round, oblong, oval or of any other desired shape.

The invention is illustrated by the accompanying drawing in which Figures 1–4 and 1A–4A are respectively front and sectional views illustrating the various steps in the manufacture of a lens constructed in accordance with the method of this invention.

Figures 5–7 and 5A–7A are respectively front and sectional views of three forms of lens constructed in accordance with this invention.

In Figures 5A–7A the section lines have for the sake of clearness been omitted.

Referring to Figures 1 and 1A, 1 indicates the major lens or countersink wherein is ground a depression. 2 (Figures 2, 2A) is a segment piece of the same glass wherein is cut a hole 3 for the reception of an insert or button 4 (Figures 3 and 3A). The segment piece including its insert, after fusion together and having been suitably ground, is then placed upon the depression in the lens 1, and the whole fused together.

In the foregoing figures and Figures 5 and 5A it will be noticed that the segment piece 2 is positioned with its vertical axis c—d coincident with the vertical meridian a—b of the major lens 1, the insert 4 being at the top of the segment piece.

After grinding and finishing the lens it is evident that the thickest portion of the insert will remain at the underside giving therefore prism base down. Referring now to Figures 6 and 6A the vertical axis of the segment piece has been turned through an angle of 180° with respect to the major lens with the result that prism base up is obtained. Figures 7 and 7A show a lens with prism base in for reading, the vertical meridian having been turned through an angle of 90°.

Referring again to Figure 4 there are shown three half circles which when using operation No. 2, are marked upon the inner surface of the glass of the segment piece and/or the major lens to denote the size of the segment circle 5 and in order to afford a guide to the person grinding the lens for the purpose of enabling him to gauge the amount of glass to be removed until the required size of segment circle remains.

From the above it will be seen that by varying the size of the segment circle any reasonable amount of prismatic power may be obtained and by varying the position of the circle that any direction of the prism will be given. Furthermore it will be readily seen that the shape of the insert and thus the reading segment need not be round as shown but may be of any desired shape and size according to the habits or vocation of the wearer.

What we claim is:—

1. A method for the manufacture of a fused bifocal lens which comprises fusing on to a major lens a segment of substantially the same refractive index having an insert of a different refractive index, controlling the prism direction by suitably setting the angular relation between the axes of the main lens and the segment, providing guide marks at the boundary surface between the major lens and the segment and grinding till the guide marks disappear.

2. A method for the manufacture of a fused bifocal lens which comprises fusing on to the major lens a segment of substantially the same refractive index having an insert of a higher refractive index, controlling the prism direction by suitably setting the angular relation between the axes of the main lens and the segment, controlling the amount of prism by suitably setting the surface of the depression in the major lens to which the segment is to be fused, providing guide marks at the boundary surface between the major lens and the segment and grinding till the guide marks disappear.

In testimony that we claim the foregoing as our invention we have signed our names this sixth day of May 1930.

EDWARD CULVER.
ALFRED HENRY EMERSON.